US008837988B1

(12) United States Patent
Hara et al.

(10) Patent No.: US 8,837,988 B1
(45) Date of Patent: Sep. 16, 2014

(54) IMAGE READING APPARATUS

(71) Applicant: Seiko Epson Corporation, Tokyo (JP)

(72) Inventors: Koji Hara, Shiojiri (JP); Soichiro Kii, Shiojiri (JP); Kohei Usuda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/211,555

(22) Filed: Mar. 14, 2014

(30) Foreign Application Priority Data

Mar. 26, 2013 (JP) ................................ 2013-064508

(51) Int. Cl.
*G03B 15/00* (2006.01)

(52) U.S. Cl.
USPC .......................................................... 399/125

(58) Field of Classification Search
USPC .......................................................... 399/125
See application file for complete search history.

(56) References Cited

U.S. PATENT DOCUMENTS

| | | | | |
|---|---|---|---|---|
| 6,510,301 | B2 * | 1/2003 | Tanaka | 399/125 |
| 8,099,016 | B2 * | 1/2012 | Ito et al. | 399/107 |
| 2006/0088336 | A1 * | 4/2006 | Hirose et al. | 399/110 |
| 2008/0175620 | A1 * | 7/2008 | Ohta et al. | 399/125 |
| 2011/0064469 | A1 * | 3/2011 | Itabashi | 399/125 |
| 2011/0075178 | A1 | 3/2011 | Nishikawa | |
| 2011/0075230 | A1 | 3/2011 | Kawai | |
| 2011/0211223 | A1 * | 9/2011 | Ito | 358/1.15 |

FOREIGN PATENT DOCUMENTS

| | | |
|---|---|---|
| JP | 2006-042003 | 2/2006 |
| JP | 2011-071820 | 4/2011 |
| JP | 2011-071929 | 4/2011 |

* cited by examiner

*Primary Examiner* — Rodney Fuller
(74) *Attorney, Agent, or Firm* — Workman Nydegger

(57) ABSTRACT

An image reading apparatus includes a substructure, a first opening and closing body that opens and closes the upper portion of the substructure, and a second opening and closing body that opens and closes the upper portion of the first opening and closing body, and includes a locking mechanism in which the first opening and closing body and the second opening and closing body do not enter the opened state at the same time.

7 Claims, 10 Drawing Sheets

IMAGE READING APPARATUS

INCORPORATED BY REFERENCE

The entire disclosure of Japanese Patent Application No. 2013-064508, filed Mar. 26, 2013 is expressly incorporated by reference herein

BACKGROUND

1. Technical Field

The present invention relates to an image reading apparatus represented by a scanner.

2. Related Art

There are cases where a scanner, which is an example of an image reading apparatus, is provided on the upper portion of a recording apparatus, which is an example of a substructure, performing recording on a recording sheet. In this case, the scanner is provided to open and close the upper portion of the recording apparatus for maintenance of the recording apparatus. The opening and closing is frequently performed by a rotation operation of the scanner.

Further, a cover that opens and closes the scanner unit is provided at the upper portion of the scanner, and the cover is in many cases provided so as to open and close the scanner unit through a rotation operation. Alternatively, there are cases in which an automatic document transport device called an automatic document feeder (ADF) is provided on the upper portion of a scanner in place of such a cover; however, in many cases, the automatic document feeder is also provided so as to open and close the scanner unit by rotating.

Here, because the ADF in particular is heavy, there is concern of the ADF also opening due to momentum when the scanner is opened, and since the scanner is also heavy, there is concern of the apparatus falling over due to both being opened. In order to avoid such a problem, an apparatus configured such that in a case where one of the scanner and the cover or ADF is opened, the other is locked and both do not open at the same time has been proposed, as in JP-A-2006-42003, JP-A-2011-71820, and JP-A-2011-71929.

Here, the scanner is in many cases heavier than the cover or ADF on the upper portion thereof, and a comparatively strong force is necessary when opening the scanner. Therefore, a greater force acts more easily at a locking location that locks the scanner with respect to the substructure than the locking location that locks the cover or ADF with respect to the scanner.

However, since the locking mechanisms of any of JP-A-2006-42003, JP-A-2011-71820, and JP-A-2011-71929 have a configuration that locks the scanner with respect to the substructure using an arm (lever) that rotates, there is concern of the lock being released by the arm receiving force in the locking release direction due to a large force when the scanner in a locked state is to be opened, alternatively there is concern of the arm not withstanding a load and being damaged.

SUMMARY

An advantage of some aspects of the present invention is to provide an opening and closing body provided on the upper portion of a substructure that more strongly locks with respect to the substructure.

According to a first aspect of the invention, there is provided an image reading apparatus, including a substructure; a first opening and closing body that opens and closes the upper portion of the substructure; and a second opening and closing body that opens and closes the upper portion of the first opening and closing body; in which the first opening and closing body includes a first locking member which is positioned at a locking position that locks the first opening and closing body with respect to the substructure when the second opening and closing body is in an opened state, which is positioned in a locking release position that releases the locking of the first opening and closing body with respect to the substructure when the second opening and closing body is in a closed state, and which is displaced between the locking position and the locking release position by sliding in a direction intersecting the vertical direction, and a second locking member which is positioned at a locking position that locks the second opening and closing body with respect to the first opening and closing body when the first opening and closing body is in an opened state, which is positioned in a locking release position that releases the locking of the second opening and closing body with respect to the first opening and closing body when the first opening and closing body is in a closed state, and which is switchable between the locking position and the locking release position by rotating.

According to the aspect, the first locking member that locks with respect to the substructure the first opening and closing body that opens and closes the upper portion of the substructure is displaced between a locking position that locks the first opening and closing body and a locking release position that releases the locking thereof by sliding in a direction that intersects the vertical direction. Accordingly, when the first opening and closing body is opened with the first opening and closing body provided on the upper portion of the substructure in the opened state, even if a large force is applied to the first locking member, it is possible for the first locking member to reliably resist such a large force, and possible to more strongly lock the first opening and closing body with respect to the substructure.

According to a second aspect of the invention, it is preferable that the first locking member of the first aspect be provided in an engaged state with the second locking member, and movement of the second locking member between the locking position and the locking release position, along with the second locking member being displaceable by sliding in the vertical direction between a first position that is positioned downwards and a second position that is positioned upwards, hold the first locking member in the locking release position in the first position, and permit displacement of the first locking member from the locking release position to the locking position in the second position, in addition to the rotating operation.

According to the aspect, since the configuration is able to perform switching of both the position and the posture by engaging the first locking member and the second locking member, it is possible to achieve better assembling workability and saving on installation space compared to a configuration in which the first locking member and the second locking member are provided at separate positions.

According to a third aspect of the invention, it is preferable that the first opening and closing body of the second aspect include a position regulating member that permits rotation of the second locking member when the second locking member is in the first position, and hold the position of the second locking member in the locking release position by regulating the rotation of the second locking member when the second locking member is in the second position. According to the aspect, the actions and effects of the either of the first or second aspects are obtained in a configuration including a position regulating member.

According to a fourth aspect of the invention, it is preferable that the first opening and closing body of the third aspect include a first biasing unit that biases the first locking member in the locking position direction, a second biasing unit that biases the second locking member in the locking position direction, and a third biasing unit that biases the second locking member in the second position direction, and the second opening and closing body hold the second locking member in the first position in the closed state, and permits displacement of the second locking member from the second position to the first position in the opened state, and the substructure include a position holding portion that holds the position of the second locking member in the locking release position by engaging the second locking member when the first opening and closing body and the second opening and closing body are in the closed state.

According to the aspect, since the locking position and the locking release position of the first locking member and the second locking member are switched therebetween due to the biasing force of each biasing unit, it is possible to achieve simplification of the apparatus configuration and cost reductions.

According to a fifth aspect of the invention, it is preferable that the second locking member of any one of the first to fourth aspects be in a state of ordinarily protruding towards the second opening and closing body from an opening portion formed in the first opening and closing body.

When the second locking member that locks the second opening and closing body with respect to the first opening and closing body is in a non-protruding state from the first opening and closing body when the second opening and closing body is open, there is concern of the second opening and closing body being closed with a medium placed as is on an opening portion through which the second locking member protrudes. In this case, the medium has the potential to be punctured by the second locking member protruding from the opening portion. However, according to the aspect, since the second locking member is in a state of ordinarily protruding from the opening portion, there is no concern of the user placing the medium on the opening portion, and it is possible to avoid the above-described defects.

According to a sixth aspect of the invention, it is preferable that the second biasing unit of the fourth or fifth aspects serve as the third biasing unit.

According to the aspect, since the second biasing unit serves as the third biasing unit, it is possible to achieve simplification of the apparatus configuration and cost reductions.

According to a seventh aspect of the invention, it is preferable that an engagement surface that engages the first locking member in the second locking member of any one of the second to sixth aspects include a first engagement surface formed in a circular arc surface that holds the first locking member in the locking release position by engaging the first locking member when the second locking member rotates, and a second engagement surface formed in an inclined surface in which the first locking member is displaced between the locking release position and the locking position by engaging the first locking member when the second locking member slides between the first position and the second position.

According to the present aspect, since the engagement surface that engages with the first locking member in the second locking member is configured of an circular arc surface that functions when the second locking member rotates and an inclined surface that functions when the first locking member and the second locking member slide, it is possible to form the appropriate engagement state according to the operation of each locking member.

BRIEF DESCRIPTION OF THE DRAWINGS

The invention will be described with reference to the accompanying drawings, wherein like numbers reference like elements.

DESCRIPTION OF EXEMPLARY EMBODIMENTS

Below, embodiments of the invention will be described with reference to the drawings. Moreover, because the same configurations in each embodiment have the same reference symbols applied thereto, description thereof will be made only in the first embodiment, and description of the configurations will not be repeated in subsequent embodiments.

Figure 1:
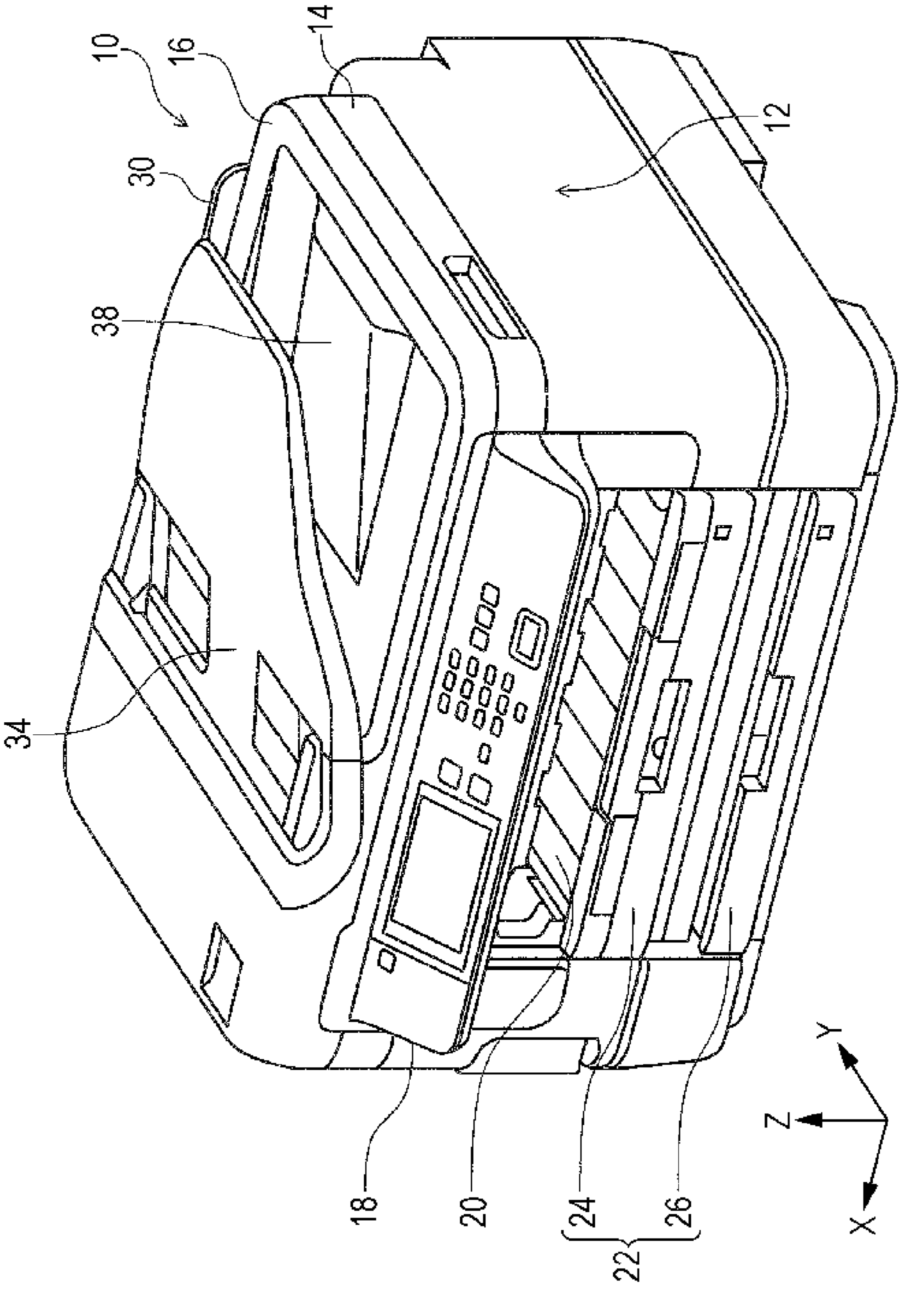
FIG. 1 is a perspective view of a printer according to an aspect of the invention.
Figure 2:
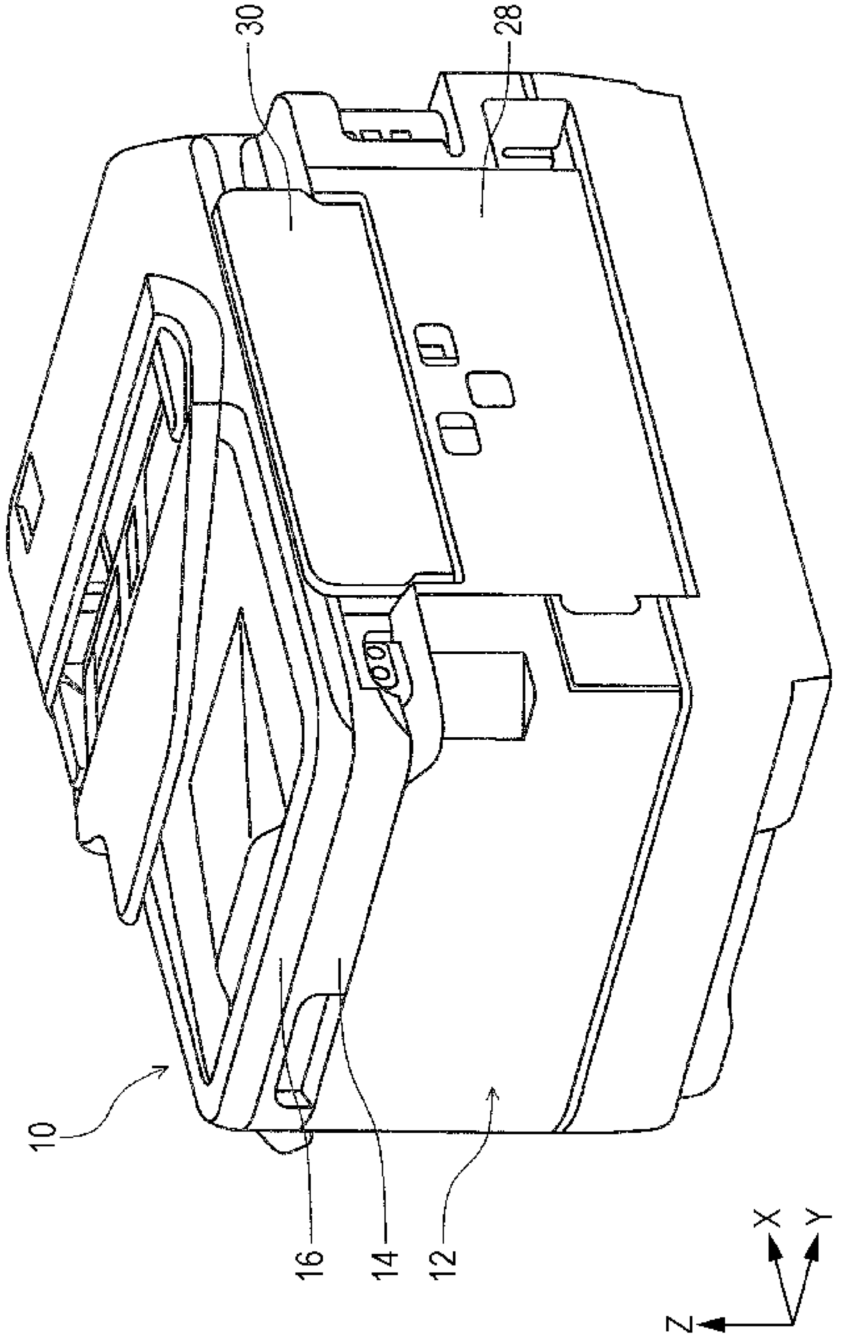
FIG. 2 is a rear perspective view of the printer according to the aspect of the invention.
Figure 3:
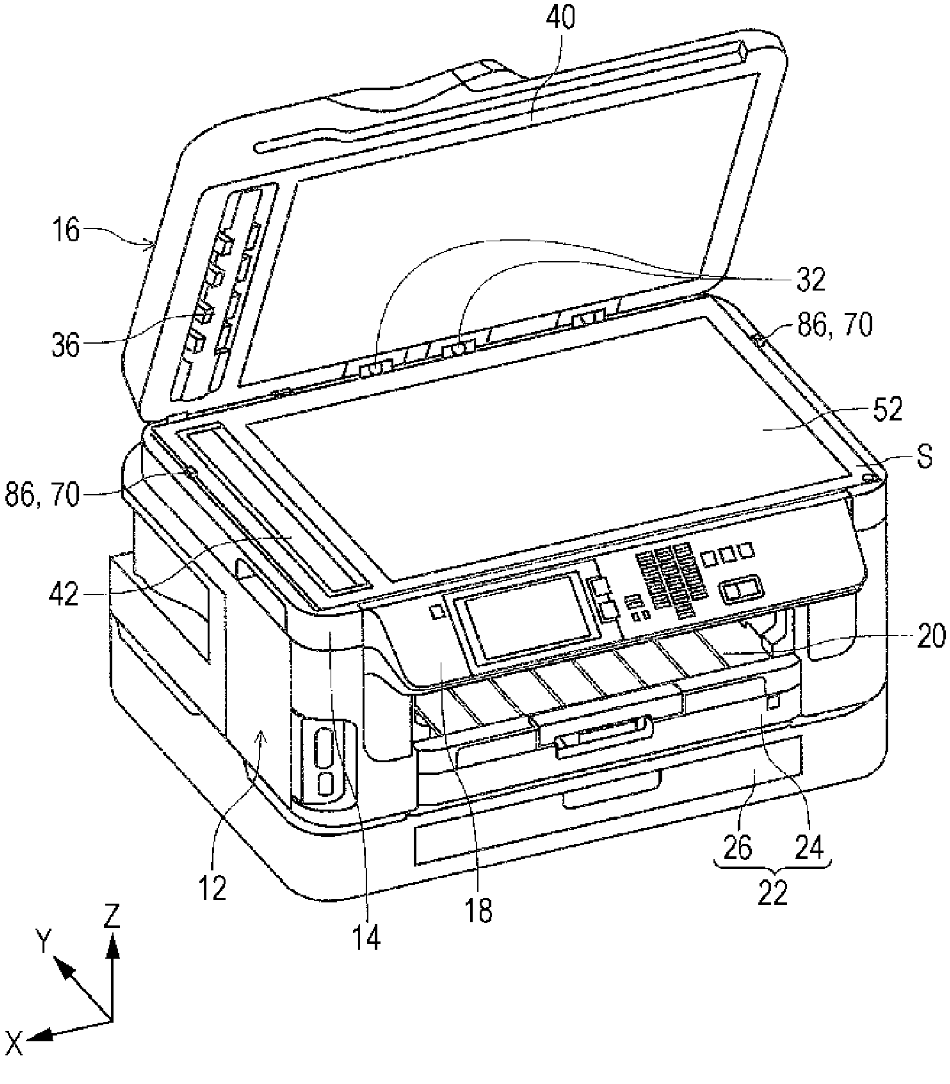
FIG. 3 is a perspective view showing an automatic document feeder (ADF) in the printer according to the aspect of the invention in an opened state.
Figure 4:
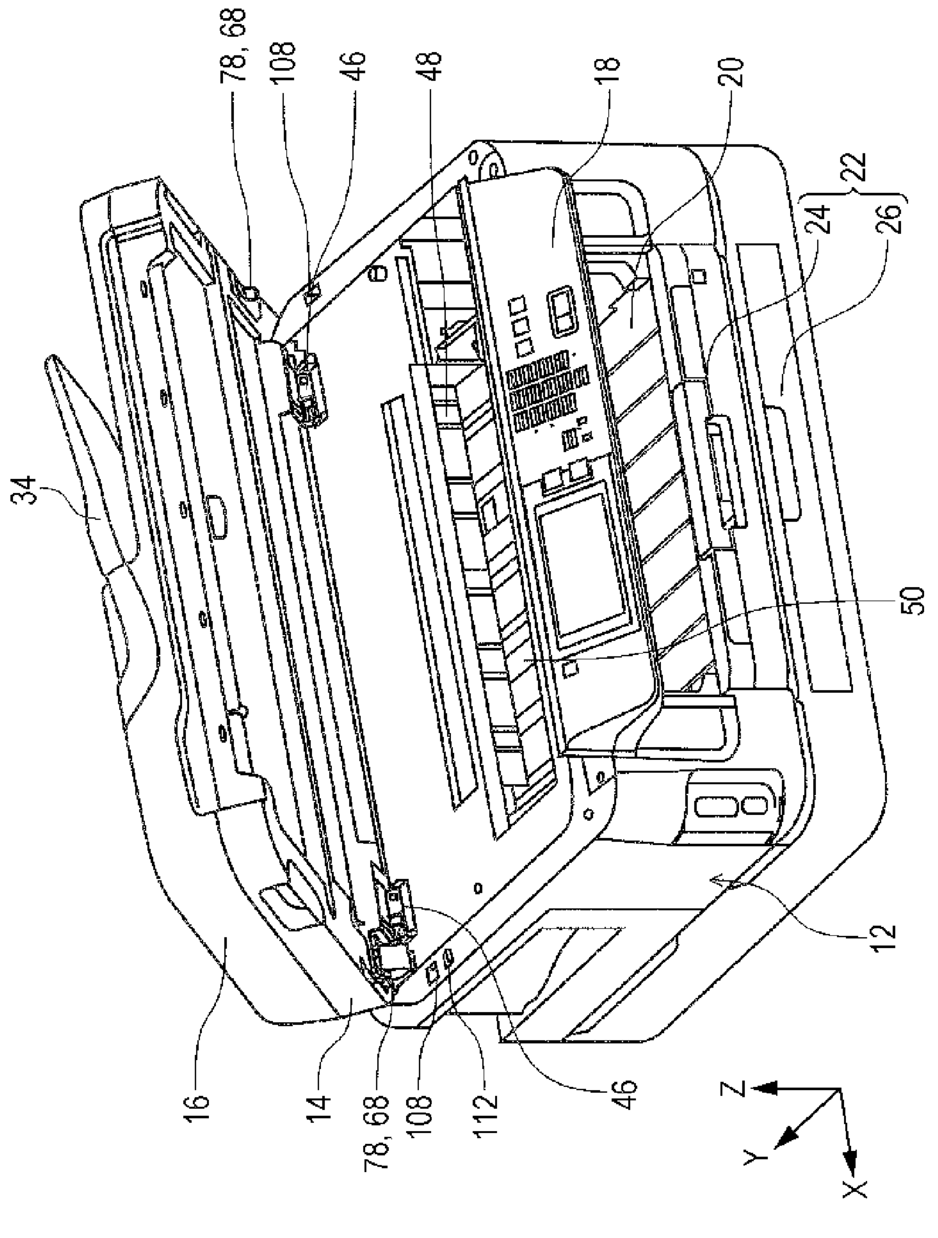
FIG. 4 is a perspective view showing a scanner unit in the printer according to the aspect of the invention in an opened state.
Figure 5:
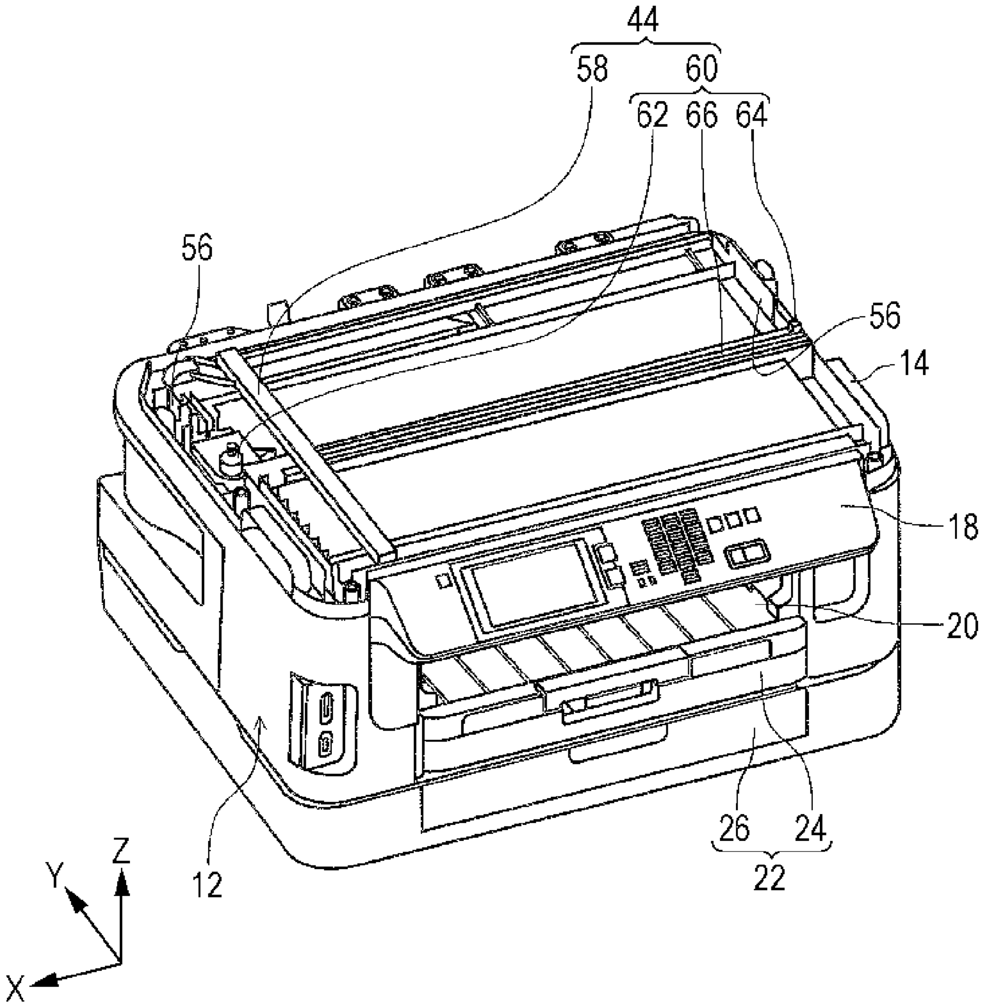
FIG. 5 is an internal perspective projection of the scanner unit in the printer according to the aspect of the invention.

FIG. 1 is a perspective view of a printer according to the aspect of the invention, FIG. 2 is a rear perspective view of the printer of the aspect of the invention, FIG. 3 is a perspective view showing an automatic document feeder (ADF) in a printer according to the aspect of the invention in an opened state, FIG. 4 is a perspective view showing a scanner unit in the printer according to the aspect of the invention in an opened state, and FIG. 5 is an internal perspective projection of the scanner unit in the printer according to the aspect of the invention.

Figure 6A:
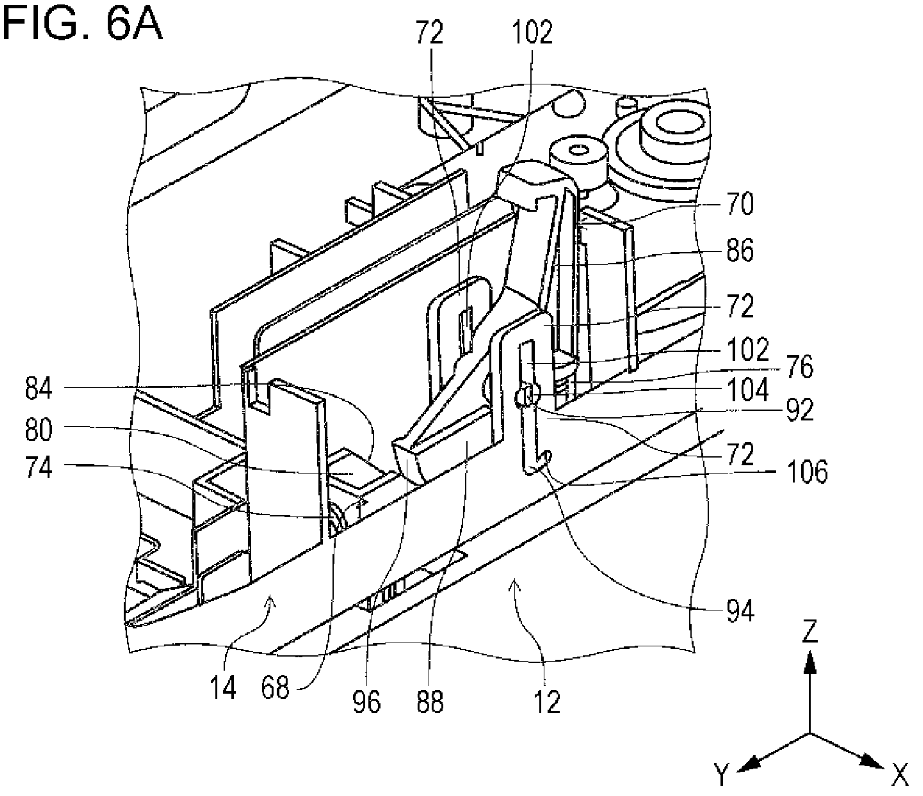
FIG. 6A is a perspective view of the automatic document feeder (ADF) and a locking mechanism of the scanner unit in the printer according to the aspect of the invention.
Figure 6B:
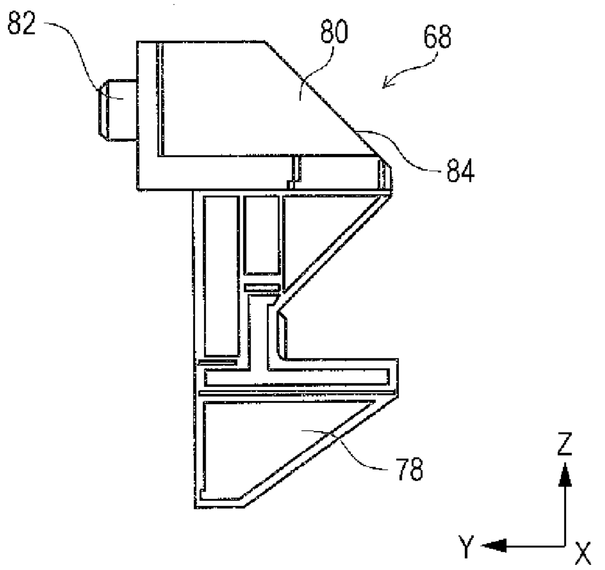
FIG. 6B is a side view of a first locking member in the locking mechanism.
Figure 7A:
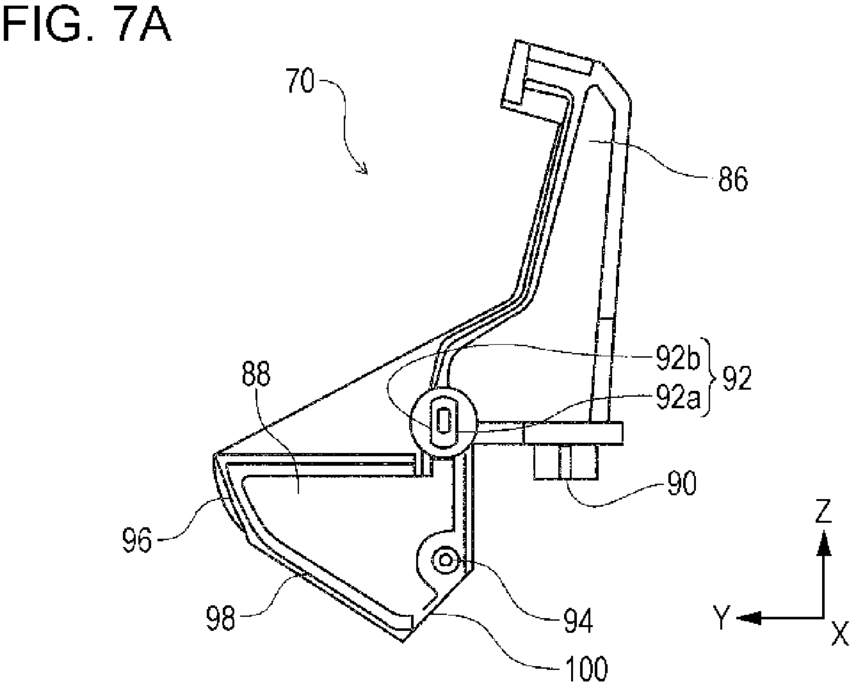
FIG. 7A is a side view of a second locking member in the locking mechanism.
Figure 7B:
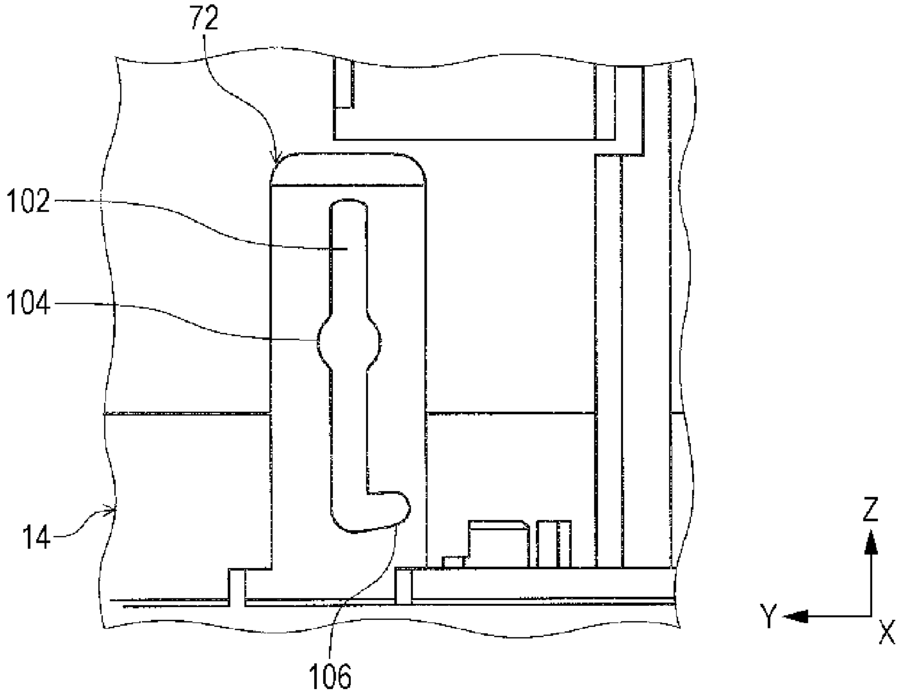
FIG. 7B is a side view of a position regulating member that regulates the position of the second locking member.
Figure 8:
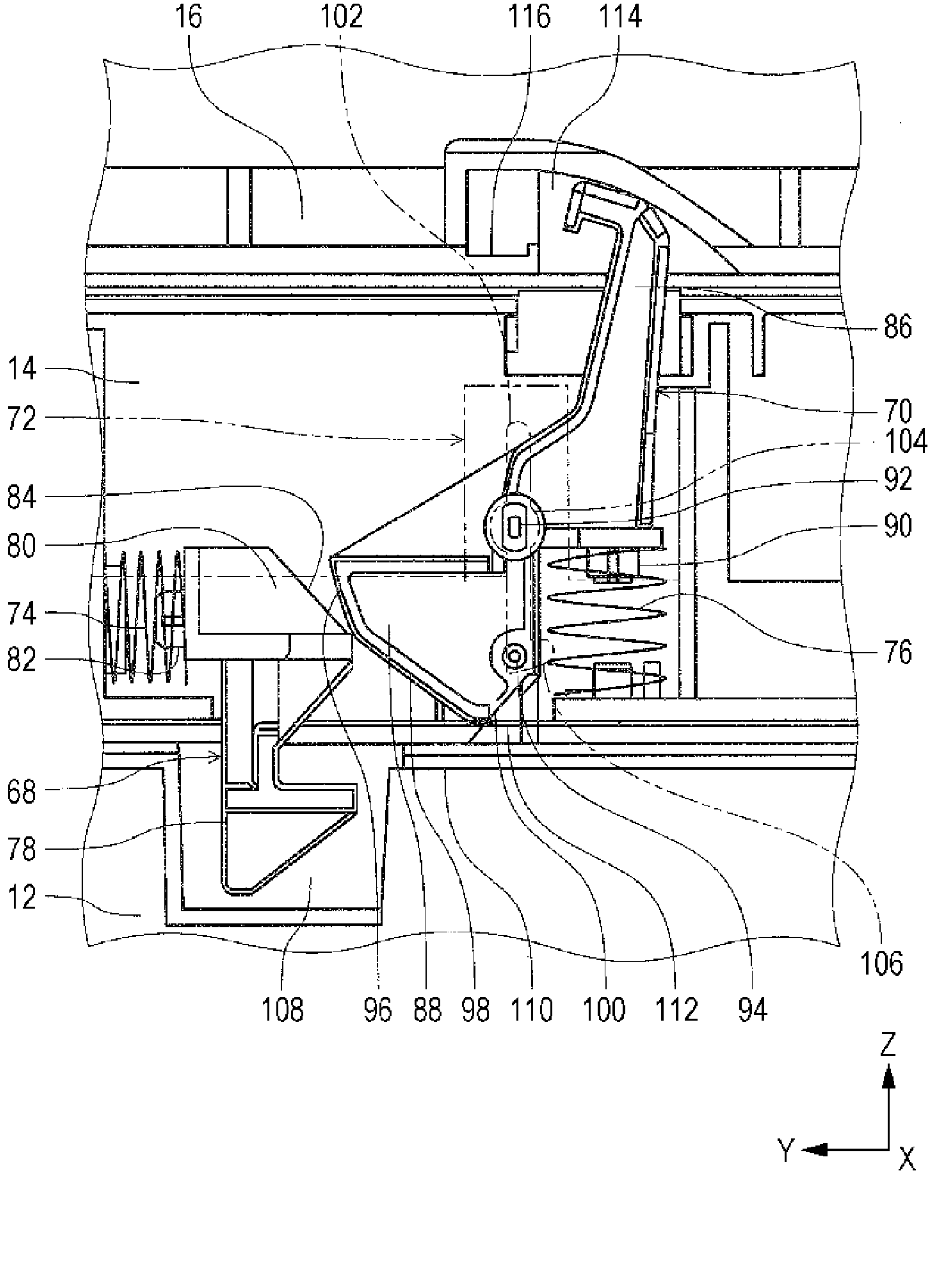
FIG. 8 is a side view of the locking mechanism when the automatic document feeder (ADF) and the scanner unit are in a closed state in the apparatus main body.

FIG. 6A is a perspective view of the automatic document feeder (ADF) and a locking mechanism of the scanner unit in the printer according to the aspect of the invention, FIG. 6B is a side view of a first locking member in the locking mechanism, FIG. 7A is a side view of a second locking member in the locking mechanism, FIG. 7B is a side view of a position regulating member that regulates the position of the second locking member, and FIG. 8 is a side view of the locking mechanism when the automatic document feeder (ADF) and the scanner unit are in a closed state in the apparatus main body.

Figure 9A:
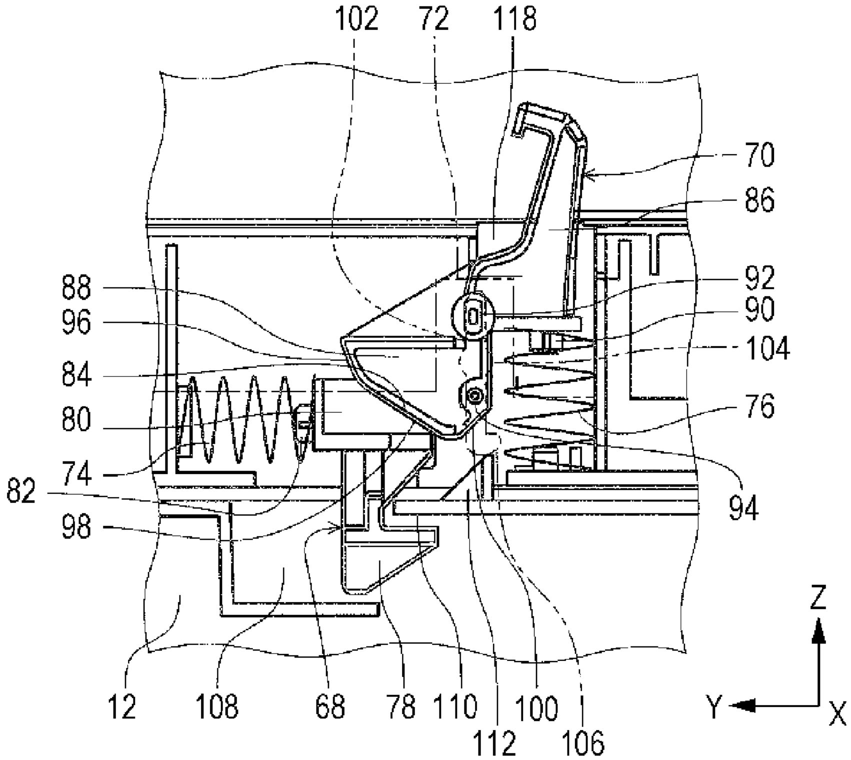
FIG. 9A is a side view of the locking mechanism when the automatic document feeder (ADF) is in an opened state.
Figure 9B:
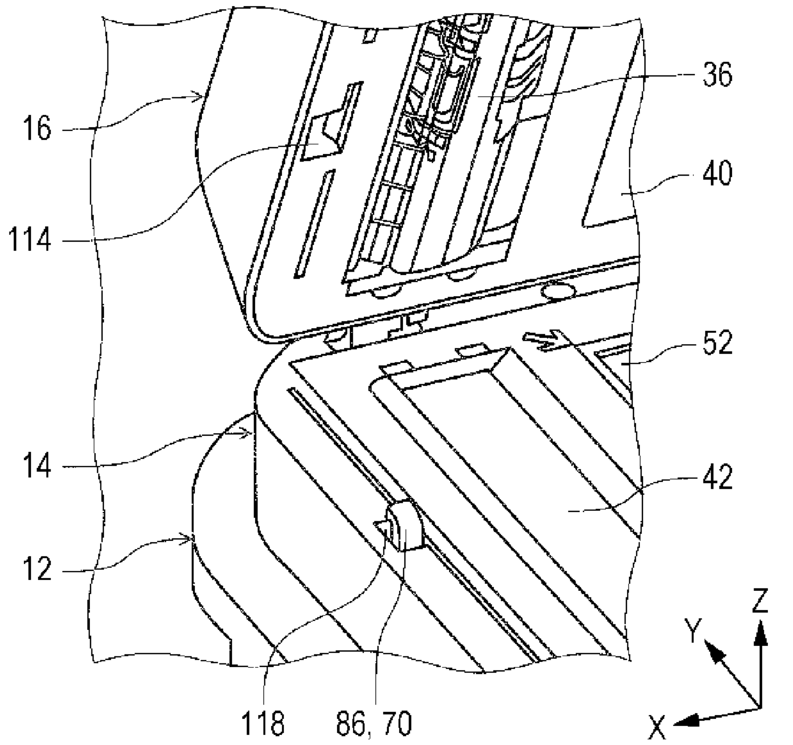
FIG. 9B is a perspective view showing the second locking member in the scanner unit when the automatic document feeder (ADF) is in an opened state.
Figure 10A:
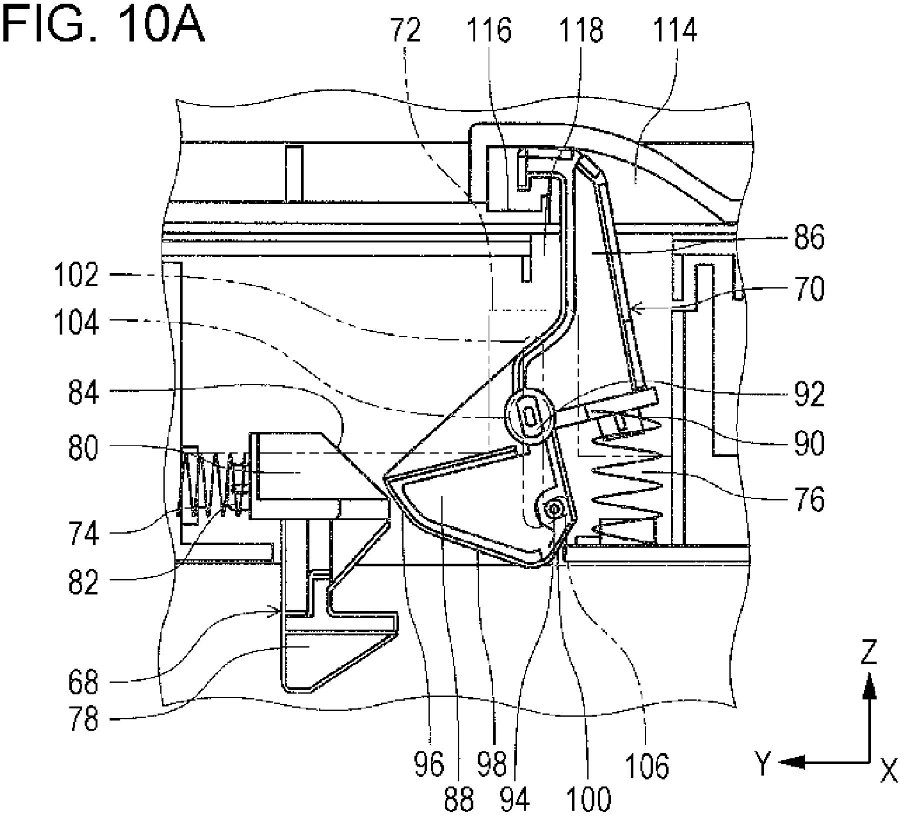
FIG. 10A is a side view of the locking mechanism when the scanner unit is in an opened state with respect to the apparatus main body.
Figure 10B:
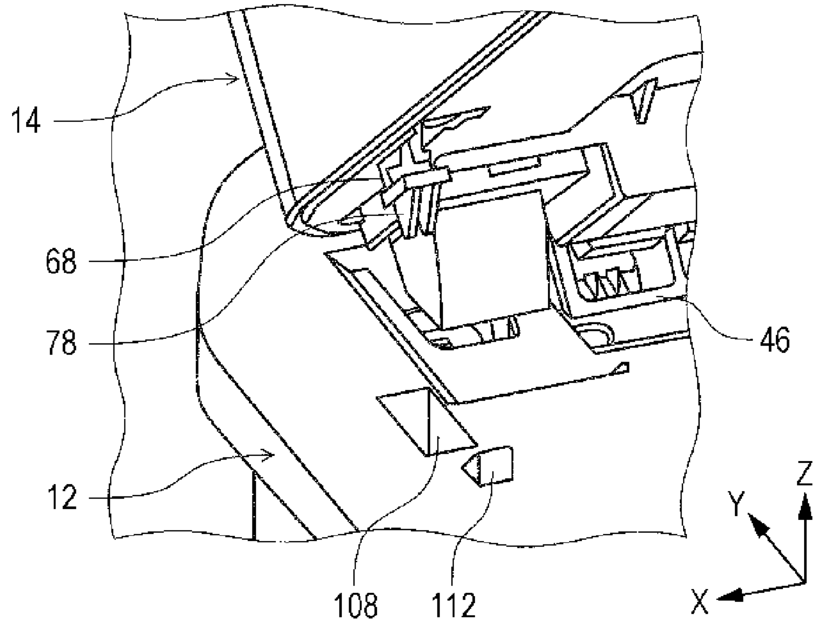
FIG. 10B is a perspective view of the first locking member when the scanner unit is in an opened state with respect to the apparatus main body.

FIG. 9A is a side view of the locking mechanism when the automatic document feeder (ADF) is in an opened state, FIG. 9B is a perspective view showing the second locking member in the scanner unit when the automatic document feeder (ADF) is in an opened state, FIG. 10A is a side view of the locking mechanism when the scanner unit is in an opened state with respect to the apparatus main body, and FIG. 10B is a perspective view of the first locking member when the scanner unit is in an opened state with respect to the apparatus main body.

In addition, for the X-Y-Z coordinate system shown in each of the drawings, the X direction indicates the width direction of the recording apparatus, the Y direction indicates the depth direction of the recording apparatus, and the Z direction indicates the height direction of the recording apparatus. Moreover, in each of the drawings, the −Y direction side is the front surface side of the apparatus, and the +Y direction side is the rear surface side of the apparatus.

With reference to FIG. 1 and FIG. 2, an image reading apparatus 10 according to the aspect of the invention is shown. The image reading apparatus 10 includes an apparatus main body 12 as a "substructure", a scanner unit 14 as the "first opening and closing body" that opens and closes the upper portion of the apparatus main body 12, and an automatic document feeder (ADF) 16 (below, referred to as "ADF 16") as a "second opening and closing body" that opens and closes the upper portion of the scanner unit. The apparatus main body 12 includes an operation panel 18 for the user to operate the image reading apparatus 10 in the front surface side of the apparatus (−Y direction side in FIG. 1), a discharge port 20 opened in the front surface side of the apparatus, and a medium accommodation portion 22 arranged below the discharge port 20.

The medium accommodation 22 includes an upper side tray 24 that is positioned to the upper side in the Z-axis direction, and a lower side tray 26 that is positioned below the upper side tray 24. The upper side tray 24 and the lower side tray 26 are each configured to be attachable to and removable from the apparatus front side (−Y direction in FIG. 3) with respect to the apparatus main body 12. In addition, the operation panel 18 is configured to include a power button, a print settings button, a display panel and the like for operating the image reading apparatus 10.

In addition, a transport portion that transports a medium P, not shown, from the medium accommodation portion 22, a recording portion that performs recording on the recording surface of the medium P, a discharge portion that discharges the medium P on which recording is performed by the recording portion from the discharge port 20, and a transport path that transports medium P to the discharge portion from the medium accommodation portion 22 via the recording portion are provided in the apparatus main body 12.

In addition, the apparatus main body 12 includes a rear surface cover 28 configured to be rotatable with respect to the apparatus main body 12, in the rear surface side of the apparatus (+Y direction side in FIG. 2). Moreover, in FIG. 2, the rear surface cover 28 is in a closed state with respect to the apparatus main body 12. In addition, the rear surface cover 28 includes a first medium support tray 30 rotatably connected with respect to the rear surface cover 28 on the free end side of the rear surface cover.

First Embodiment

Next, the scanner unit 14 and the ADF 16 will be described. With reference to FIG. 1 and FIG. 3, the ADF 16 is arranged on the upper portion of the scanner unit 14. The ADF 16 is connected to the scanner unit 14 to be rotatable via a rotation axis 32 at the end portion on the +Y direction side in the upper portion of the scanner unit 14. Therefore, in the present embodiment, the ADF 16 opens and closes the end portion on the −Y direction side by rotating with respect to the scanner unit 14 as the free end.

In addition, the ADF 16 includes a second medium support tray 34, a medium transport portion 36, a medium discharge stack 38, and a document pushing member 40 provided on the lower surface of the ADF 16. The medium transport portion 36 transports the medium P supported by the second medium support tray 34 in a state (refer to FIG. 1) in which the ADF 16 is closed with respect to the scanner unit 14, and discharges the medium to the medium discharge stack 38 after being read by the optical scanning portion 44 (refer to FIG. 5) in the ADF reading surface 42 (refer to FIG. 3) provided on the upper portion of the scanner unit 14.

Next, the configuration of the scanner unit 14 will be described with reference to FIG. 3 to FIG. 5. The scanner unit 14 is arranged on the upper portion of the apparatus main body 12, as shown in FIG. 3 and FIG. 4. In addition, the scanner unit 14 is rotatably connected to the apparatus main body 12 via the rotation shaft 46 at the end portion on the +Y direction side in the upper portion of the apparatus main body 12. Therefore, in the present embodiment, the scanner unit 14 opens and closes by rotating the end portion on the −Y direction side with respect to the apparatus main body 12 as a free end.

In addition, the scanner unit 14 opens at least a portion of the movement region 50 in the X-axis direction of the carriage (not shown) via the opening portion 48 provided in the upper portion of the apparatus main body 12 when in an opened state (refer to FIG. 4) with respect to the apparatus main body 12.

Therefore, when a paper jam of the medium P occurs in the movement region 50 of the carriage, the user is able to access with respect to the movement region 50 via the opening 48 by putting the scanner unit 14 in an opened state with respect to the apparatus main body 12, and it is possible to easily remove the jammed medium P.

In addition, the scanner unit 14 includes a document placement surface 52 (refer to FIG. 3), an optical scanning portion 44, and a locking mechanism 56. The document placement surface 52 is provided on the upper portion of the scanner unit 14. The document placement surface 52 is formed from a transparent glass plate. In the present embodiment, an document reading origin point S for reading the document placed on the document placement surface 52 by the optical scanning portion 44 in the end portion on the −X direction side of the document placement surface 52 is set. Moreover, the periphery of the document placement surface 52 becomes one level higher than the document placement surface 52, and, thereby, it becomes possible to position the corner portion of the document by bumping with respect to the document reading origin point S.

In addition, when the ADF 16 is in an opened state with respect to the scanner unit 14, the medium P is placed on the document placement surface 52. Thereafter, the medium P is in a readable state by closing the ADF 16 with respect to the scanner unit 14. In this case, for the medium P placed on the document placement surface 52, the surface of the opposite side of the medium P to the side facing the document placement surface 52 is pressed by a document pushing member 40 provided in the ADF 16.

In so doing, the medium P is uniformly pressed with respect to the document placement surface 52, and the medium P does not float away from the document placement surface 52. Moreover, the size of the document pushing member 40 is set to the same size as the size of the document placement surface 52 so that all regions of the surface of the opposite side of the medium P placed on the document placement surface 52 are pressed.

In addition, an ADF reading surface 42 is provided on the +X direction side of the document placement surface 52 in the upper portion of the scanner unit 14. The ADF reading surface 42 is provided at a position at which the medium P transported by the medium transport portion 36 of the ADF 16 is readable in a case in which the optical scanning unit 54 described below is in a standby position.

In addition, with reference to FIG. 5, the optical scanning portion 44 includes a reading portion 58 and a driving mechanism 60. The reading portion 58 extends in the Y-axis direction in FIG. 5, and corresponds to the length in the Y-axis direction of the document placement surface 52 and the ADF reading surface 42. The driving mechanism 60 extends along the X-axis direction in FIG. 5. The driving mechanism 60 is driven to rotate by a driving source (not shown), and includes a driving pulley 62 provided at the end portion of the scanner unit 14 on the +X direction side, a driven pulley 64 provided at the end portion of the scanner unit 14 on the −X direction side, and an endless belt 66 wound between the driving pulley 62 and the driven pulley 64.

The endless belt 66 is connected to the reading portion 58, and the reading portion 58 is moved in the +X direction and the −X direction along the X-axis direction according to the rotation of the driving pulley 62. In so doing, it is possible to perform reading of the surface of the medium P placed on the document placement surface 52 opposing the document placement surface. Moreover, in the present embodiment, the reading position (refer to FIG. 3) of the ADF reading surface 42 is set along with the position of the reading portion 58 shown in FIG. 5 being the standby position of the reading portion.

Next, the locking mechanism 56 according to the present embodiment will be described in detail. With reference to FIG. 5 and FIG. 6A, a locking mechanism 56 is provided at each of the end portion on the +X direction side and the end portion on the −X direction side in the X-axis direction in the scanner unit 14. The locking mechanism 56 includes a first locking member 68, a second locking member 70, a position regulating member 72, a first biasing member 74 as a “first biasing unit”, and a second biasing member 76 as a “second biasing unit” serving as a “third biasing unit”.

With reference to FIG. 6B, the first locking member 68 includes a hook portion 78, an engagement portion 80 and a biasing member holding portion 82. The engagement portion 80 includes an engagement surface 84 inclined to the −Y direction side in the Z-axis direction in FIG. 6B.

With reference to FIG. 7A, the second locking member 70 includes a hook portion 86, an engagement portion 88, a biasing member holding portion 90, a first pin 92, and a second pin 94. The engagement portion 88 further includes a first engagement surface 96 formed with a circular arc surface, a second engagement surface 98 formed with an inclined surface, and a third engagement surface 100 formed as an inclined surface in the surface of the opposite side to the second engagement surface 98 in the Y-axis direction. The first pin 92 is formed as a columnar-shaped pin, notches are further formed at both end thereof in the Y-axis direction in FIG. 7A, and notch surfaces 92*a* and 92*b* are formed. Moreover, the center of the circular arc of the first engagement surface 96 in the present embodiment is set so as to match the central axis of the first pin 92.

With reference to FIG. 6A and FIG. 7B, the position regulating member 72 extends in the Z-axis direction in FIG. 6A in the scanner unit 14, and is formed as a pair of plate-like members spaced apart in the X-axis direction. In addition, a second locking member 70 is arranged between the pair of position regulating members 72 in the X-axis direction, as shown in FIG. 6A. Each of the position regulating members 72 includes a groove portion 102 extending in the Z-axis direction. The groove portion 102 includes a rotation permitting portion 104, and a rotation regulating portion 106.

The first pin 92 and the second pin 94 in the second locking member 70 arranged between the pair of position regulating members 72 as shown in FIG. 6A are engaged with the groove portion 102 of the position regulating members 72 to be slidable in the Z-axis direction in FIG. 6A. That is, the second locking member 70 slides in the Z-axis direction while holding the posture of the second locking member 70 through the notch surfaces 92*a* and 92*b* of the first pin 92 contacting the groove portion 102.

Here, when the first pin 92 of the second locking member 70 is positioned at the rotation permitting portion 104 of the groove portion 102, the contact state between the notch surfaces 92*a* and 92*b*, and the groove portion 102 is cancelled, and the second locking member 70 becomes rotatable with the first pin 92 as a rotation fulcrum. In this case, the second pin 94 is positioned at the end portion of the groove portion 102 in the −Z direction, and is displaced from the end portion of the groove portion 102 in the −Z direction to the rotation regulating portion 106 while rotating in the counter clockwise direction according to the rotation of the second locking member 70. Then, the rotation regulating portion 106 is configured so as to regulate the rotation in the counter clockwise direction of a predetermined angle or greater in the second locking member 70.

Next, with reference to FIG. 8, one end of the first biasing member 74 is attached to the scanner unit 14, and the other end is attached to the biasing member holding portion 82 of the first locking member 68. Therefore, the first biasing member 74 biases the first locking member 68 towards the −Y direction in FIG. 8, that is, the lock position that locks the scanner unit 14 described below to the apparatus main body 12. Moreover, in the present embodiment, the first biasing member 74 is configured as a spring member.

In addition, one end of the second biasing member 76 is attached to the scanner unit 14, and the other end is attached to the biasing member holding portion 90 of the second locking member 70. Therefore, the second biasing member 76 biases the second locking member 70 in the +Z direction in FIG. 8. Moreover, in the present embodiment, the second biasing member 76 is configured as a spring member.

In addition, when the scanner unit 14 is in a closed state with respect to the apparatus main body 12, a concavity 108 (refer to FIG. 8) in which the hook portion 78 of the first locking member 68 is received is provided in the apparatus main body 12. Furthermore, when the scanner unit 14 is in a closed state with respect to the apparatus main body 12, a locking portion 110 (refer to FIG. 9A) that locks the scanner unit 14 so as not to open with respect to the apparatus main body 12 by locking the hook portion 78 of the first locking member 68 is provided in the apparatus main body 12. Furthermore, an inclined face is included in the upper portion of the apparatus main body 12, and a position holding portion 112 that holds the position of the second locking member 70 is provided.

In addition, when the ADF 16 is closed with respect to the scanner unit 14, a concavity 114 in which the hook portion 86 of the second locking member 70 is received is provided in the ADF 16. Furthermore, when the ADF 16 is in a closed state with respect to the scanner unit 14, a locking portion 116 (refer to FIG. 10A) that locks the ADF 16 with respect to the scanner unit 14 so as not to open by locking the hook portion 86 of the second locking member 70 is provided in the ADF 16.

In addition, the state shown in FIG. 8 is a state in which the scanner unit 14 is closed with respect to the apparatus main body 12, and a state in which the ADF 16 is closed with respect to the scanner unit 14. At this time, the first locking member 68 is positioned at the locking release position (refer to FIG. 8) that releases the locking of the scanner unit 14 with respect to the apparatus main body 12. In addition, the second locking member 70 is positioned in the locking release position that releases the locking of the ADF 16 with respect to the scanner unit 14, when the scanner unit 14 is in the closed state with respect to the apparatus main body 12. Furthermore, the first locking member 68 and the second locking member 70 are provided in an engaged state.

At this time, since the ADF 16 is in a closed state with respect to the scanner unit 14, the hook portion 86 received in the concavity 114 via the opening portion 118 provided in the upper portion of the scanner unit 14 and the inner surface of the concavity 114 come into contact. In so doing, the second locking member 70 is pressed by resisting the biasing force of the second biasing member 76 in the –Z direction via the hook portion 86 due to the weight of the ADF 16 itself. Therefore, the position holding portion 112 provided in the apparatus main body 12 and the third engagement surface 100 of the second locking member 70 are engaged. Moreover, this position in the Z-axis direction in the second locking member 70 is the first position (refer to FIG. 8).

In this case, the first pin 92 is positioned at the rotation permitting portion 104 of the position regulating member 72; however, since the position holding portion 112 and the third engagement surface 100 are engaged, the rotation of the second locking member 70 in the counter clockwise direction is regulated. That is, the position holding portion 112 holds the position of the second locking member in the locking release position by regulating the rotation of the second locking member 70 when the second locking member 70 is in the first position. In addition, in the second locking member 70, rotation in the clockwise direction is regulated by the biasing force of the second biasing member 76. Therefore, the second locking member 70 in the state in FIG. 8 is held in this position by the position holding portion 112 and the second biasing member 76.

In addition, the first locking member 68 is biased in the –Y direction in a direction intersecting the vertical direction, that is, the Y-axis direction, by the first biasing member 74. However, because the engagement surface 84 of the first locking member 68 and the first engagement surface 96 of the second locking member 70 are in contact, and enter an engaged state, displacement in the –Y direction of the first locking member 68 is regulated by the first engagement surface 96 of the second locking member 70. Therefore, the first locking member 68 is unable to move in the locking state in which the hook portion 78 is locked to the locking portion 110 by moving in the –Y direction, and a state in which the hook portion 78 is only received in the concavity 108, that is, the locking release state, is held.

Next, when the ADF 16 is put in an opened state by being rotated with respect to the scanner unit 14 from the state in FIG. 8, because pressure from the ADF 16 in which the second locking member 70 is pressed in the –Z direction due to its own weight is eliminated, the first pin 92 and the second pin 94 of second locking member 70 are moved in the +Z direction along the groove portion 102 due to the biasing force of the second biasing member 76. That is, the second locking member 70 slides from the first position in the +Z direction, that is, upwards. Moreover, the position of the second locking member 70 in the Z-axis direction in FIG. 9A is the second position (refer to FIG. 9A).

That is, when the ADF 16 is in a closed state with respect to the scanner unit 14, the second locking member 70 is held in the first position (refer to FIG. 8) by the ADF 16. In addition, when the ADF 16 is in an opened state with respect to the scanner unit 14, the second locking member 70 is displaced from the second position (refer to FIG. 9A) to the first position that is positioned below the second position.

The engagement of the third engagement surface 100 and the position holding portion 112 is released by the second locking member 70 sliding in the +Z direction. Moreover, in this case, since the first pin 92 moves from the rotation permitting portion 104, the notch surfaces 92*a* and 92*b* of the first pin 92 contact the groove portion 102, and rotation of the second locking member 70 is regulated.

In addition, the engagement surface 84 of the first locking member 68 releases engagement with the first engagement surface 96 of the second locking member 70, and engages the second engagement surface 98 due to second locking member 70 moving from a first position (refer to FIG. 8) to a second position positioned above the first position in the Z-axis direction. In this case, the engagement surface 84 of the first locking member 68 moves to the –Y direction side along a circular arc of the first engagement surface 96 and an inclination of the second engagement surface 98 due to the biasing force of the first biasing member 74 in the –Y direction.

That is, the first locking member 68 slides in the –Y direction. In so doing, the hook portion 78 of the first locking member 68 slides inside the concavity 108 of the apparatus main body 12, and the hook portion 78 is locked by the locking portion 110. Accordingly, when the ADF 16 is in an opened state with respect to the scanner unit 14, the first locking member 68 is positioned at a locking position that locks the scanner unit 14 so as not to open with respect to the apparatus main body 12. Therefore, the first locking member 68 is able to be displaced between the locking position and the locking release position by sliding in a direction (Y-axis direction) intersecting the vertical direction (Z-axis direction).

In addition, with reference to FIG. 9B, when the ADF 16 is in an opened state with respect to the scanner unit 14, since the second locking member 70 is in the second position (refer to FIG. 9A), the hook portion 86 is in a state of ordinarily protruding towards the ADF 16 from the opening portion 118 provided in the upper portion of the scanner unit 14.

Incidentally, in a case of a configuration in which the second locking member 70 that locks the ADF 16 with respect to the scanner unit 14 is in a non-protruding state from the scanner unit 14 when the ADF 16 is open, and the second locking member 70 protrudes in the closed state, there is concern of the ADF 16 being closed with the medium P placed on the opening portion 118 from which the second locking member 70 protrudes. In this case, the medium P has the potential to be punctured by the second locking member 70 protruding from the opening portion 118. However, since the second locking member 70 is in a state of ordinarily protruding from the opening portion 118, there is no concern of the user placing the medium P on the opening portion 118, and it is possible to avoid the above-described defects.

Next, in the state in FIG. 8, since the first locking member 68 is positioned in the locking release position, the scanner units 14 is able to attain an opened state by being rotated with respect to the apparatus main body 12 as shown in FIG. 10A. In so doing, the engagement state between the third engagement surface 100 of the second locking member 70 and the position holding portion 112 of the apparatus main body 12 is cancelled. At this time, since the second locking member 70 is positioned in the first position, the first pin 92 is positioned at the rotation permitting portion 104.

Therefore, the second locking member 70 rotates in the counter clockwise direction in FIG. 10A due to the biasing force of the second biasing member 76 with the first pin 92 positioned at the rotation permitting portion 104 as a rotation fulcrum. Therefore, the hook portion 86 of the second locking member 70 locks the locking portion 116 by moving in the concavity 114 of the ADF 16. Therefore, the second locking member 70 is at the locking position that locks the ADF 16 with respect to the scanner unit 14 when the scanner unit 14 is in an opened state with respect to the apparatus main body 12. That is, the second locking member 70 is switchable between the locking position that locks the ADF 16 with respect to the scanner unit 14 and the locking release position that releases the locking through rotating.

In addition, when the second locking member 70 rotates in the counter clockwise direction in FIG. 10A with the first pin 92 as a rotation fulcrum, since the center position of the circular arc-like first engagement surface 96 and the central axis of the first pin 92 that becomes the rotation fulcrum match, the engagement position of the engagement surface 84 of the first locking member 68 and the circular arc-like first engagement surface 96 in the Y-axis direction and the Z-axis direction in FIG. 10A does not change. Therefore, the first locking member 68 is able to hold the locking release position of the scanner unit 14 with respect to the apparatus main body 12.

That is, in the engagement member 88 of the second locking member, the first engagement surface 96 formed with a circular arc surface holds the first locking member in the locking release position by engaging the first locking member when the second locking member 70 rotates, and the first locking member is displaced between the locking release position and the locking position by the second engagement surface 98 formed with an inclined surface engaging with the first locking member 68 when the second locking member 70 slides between the first position and the second position in the Z-axis direction. Therefore, the engagement portion 80 of the first locking member 68 and the engagement portion 88 of the second locking member 70 are able to form a suitable engagement state according to the operation of each of the locking members.

Accordingly, when the ADF 16 is in the opened state with respect to the scanner unit 14, the first locking member 68 moves from the locking release position to the locking position in the Y-axis direction, and the second locking member 70 maintains the locking release position along with displacing from the first position to the second position. Therefore, the scanner unit 14 is locked so as not to open with respect to apparatus main body 12.

In addition, when the scanner unit 14 is in the opened state with respect to the apparatus main body 12, the first locking member 68 is held in the locking release position in the Y-axis direction, and the second locking member 70 is rotated from the locking release position to the locking position along with being held in the first position. Therefore, the ADF 16 is locked so as not to open with respect to the scanner unit 14.

In addition, as shown in FIG. 10B, since the first locking member 68 is positioned in the locking release position, when the scanner unit 14 is closed with respect to the apparatus main body 12, the hook portion 78 of the first locking member 68 is received in the concavity 108. Therefore, it is possible to eliminate the concern of the hook portion 78 of the first locking member 68 impacting the upper portion of the apparatus main body 12.

In addition, the second biasing member 76 in the present embodiment biases the second locking member 70 from the locking position direction (refer to FIG. 8) in the locking release position (refer to FIG. 10A) along with biasing the second locking member 70 from the first position to the second position, that is, in the +Z direction in the Z-axis direction. Therefore, since the second biasing member 76 serves as the second biasing unit and the third biasing unit, it is possible to achieve simplification of the apparatus configuration and cost reductions.

In addition, the first locking member 68 that locks the scanner unit 14 that opens and closes the upper portion of the apparatus main body 12 with respect to the apparatus main body 12 displaces between a locking position that locks the scanner unit 14 and the locking release position that release the locking by sliding in the Y-axis direction that intersects the Z-axis direction. Accordingly, when the scanner unit is to be opened in a state in which the scanner unit 14 provided on the upper portion of the apparatus main body 12 is locked, the even if a large force is applied to the first locking member 68, it is possible for the first locking member to resist such a large force, and it is possible to more strongly lock the scanner unit 14 with respect to the apparatus main body 12.

Furthermore, since, by engaging first locking member 68 and the second locking member 70, the configuration performs switching the position and the posture of both, it is possible to achieve better assembling workability and saving on installation space compared to a configuration in which the first locking member 68 and the second locking member 70 are provided at separate positions.

Modification of Example

In the present embodiment, although the configuration has a locking mechanism 56 provided at both end portions of the scanner unit 14 in the X-axis direction, the configuration may have a locking mechanism at one of either end portion in the X-axis direction. In so doing, since only one set of locking mechanisms 56 is provided in the image reading apparatus 10, it is possible to achieve simplification of the apparatus configuration and cost reductions.

In summary of the above description, the image reading apparatus 10 of the present embodiment includes an apparatus main body 12, a scanner unit 14 that opens and closes the upper portion of the apparatus main body 12, and an ADF 16 that opens and closes the upper portion of the scanner unit. The scanner unit 14, includes a first locking member 68 that is positioned at a locking position that locks the scanner unit 14 with respect to the apparatus main body 12 when the ADF 16 is in the opened state, is positioned in the locking release position that releases the locking of the scanner unit 14 with respect to the apparatus main body 12 when the ADF 16 is in the closed state, and displaced between the locking position and the locking release position by sliding in the Y-axis direction that intersects the Z-axis direction, and a second locking member 70 that is positioned at the locking position that locks the ADF 16 with respect to the scanner unit 14 when the scanner unit 14 is in the opened state, is positioned in the locking release position that releases the locking of the ADF 16 with respect to the scanner unit 14 when the scanner unit 14 is in the closed state, and is switchable between the locking position and the locking release position by rotating.

The first locking member 68 is provided in an engaged state with the second locking member 70. Movement between the locking position and the locking release position of the second locking member 70, in addition to the rotating operation, holds the first locking member 68 in the locking release position in the first position, and permits displacement from the locking release position of the first locking member 68 to the locking position in the second position, along with the second locking member 70 being displaceable between a first position that is positioned below and a second position that is positioned above by sliding in the vertical direction.

The scanner unit 14 has a position regulating member 72 that permits rotation of the second locking member 70 when the second locking member 70 is in the first position and holds the position of the second locking member 70 in the locking release position by regulating the rotation of the second locking member 70 when the second locking member 70 is in the second position. The scanner unit 14 includes a first biasing member 74 that biases the first locking member 68 in the locking position direction, and a second biasing member 76 that biases the second locking member 70 in the second position direction along with biasing the locking member in the locking position direction. The ADF 16 holds the second locking member 70 in the first position in the closed state, and permits displacement of the second locking member 70 from the second position to the first position in the opened state. The apparatus main body 12 includes a position holding portion 112 that holds the posture of the second locking member in the locking release position by engaging the second locking member 70 when the scanner unit 14 and the ADF 16 are in the closed state.

The second locking member 70 enters a state of being ordinarily protruded from the opening portion 118 formed in the scanner unit 14 towards the ADF 16. In addition, the second biasing member 76 serves as the second biasing unit and the third biasing unit.

The engagement portion 88 that engages with the first locking member 68 in the second locking member 70 is configured to include a first engagement surface 96 formed with a circular arc surface that holds the first locking member in the locking release position by engaging with the first locking member 68 when the second locking member 70, and a second engagement surface 98 formed with an inclined surface in which the first locking member is displaced between the locking release position and the locking position by engaging with the first locking member 68 when the second locking member 70 slides between the first position and the second position in the Z-axis direction.

In addition, in the present embodiment, although the image reading apparatus 10 according to the invention is applied to a recording apparatus as an example, it is possible to generally apply the image reading apparatus to other liquid ejecting apparatuses.

Here, the liquid ejecting apparatus is not limited to a recording apparatus such as a printer, copy machine, fax machine or the like in which an ink jet type recording head is used and performing recording on a recording medium by ejecting ink from the recording head, and includes an apparatus ejecting, in place of ink, a liquid corresponding to the use thereof from a liquid ejecting head corresponding to an ink jet-type recording head to an ejection medium corresponding to a recording medium, and in which the liquid is applied to the ejection medium.

In addition to the recording head, examples of the liquid ejecting head include a color material ejecting head used in the manufacturing of a color filter of a liquid crystal display or the like, an electrode material (conductive paste) ejecting head used in electrode formation of an organic EL display or a field emission display (FED) or the like, or a bio-organic ejecting head used in biochip manufacturing, or a sample ejecting head as a precision pipette.

Moreover, the invention is not limited to the embodiments described above and may be modified in various ways within the scope of the aspects described in the claims, and the modifications should be construed as being included in the invention.

What is claimed is:

1. An image reading apparatus, comprising:

a substructure;

a first opening and closing body that opens and closes the upper portion of the substructure; and a second opening and closing body that opens and closes the upper portion of the first opening and closing body, wherein the first opening and closing body includes a first locking member which is positioned at a locking position that locks the first opening and closing body with respect to the substructure when the second opening and closing body is in an opened state, which is positioned in a locking release position that releases the locking of the first opening and closing body with respect to the substructure when the second opening and closing body is in a closed state, and which is displaced between the locking position and the locking release position by sliding in a direction intersecting the vertical direction, and a second locking member which is positioned at a locking position that locks the second opening and closing body with respect to the first opening and closing body when the first opening and closing body is in an opened state, which is positioned in a locking release position that releases the locking of the second opening and closing body with respect to the first opening and closing body when the first opening and closing body is in a closed state, and which is switchable between the locking position and the locking release position by rotating.

2. The image reading apparatus according to claim 1 wherein the first locking member is provided in an engaged state with the second locking member, and movement of the second locking member between the locking position and the locking release position, along with the second locking member being displaceable by sliding in the vertical direction between a first position that is positioned downwards and a second position that is positioned upwards, holds the first locking member in the locking release position in the first position, and permits displacement of the first locking member from the locking release position to the locking position in the second position, in addition to the rotating operation.

3. The image reading apparatus according to claim 2, wherein the first opening and closing body includes a position regulating member that permits rotation of the second locking member when the second locking member is in the first position, and holds the position of the second locking member in the locking release position by regulating rotation of the second locking member when the second locking member is in the second position.

4. The image reading apparatus according to claim 3, wherein the first opening and closing body includes a first biasing unit that biases the first locking member in the locking position direction, a second biasing unit that biases the second locking member in the locking position direction, and a third biasing unit that biases the second locking member in the second position direction, wherein the second opening and closing body holds the second locking member in the first position in the closed state, and permits displacement of the second locking member from the second position to the first position in the opened state, and the substructure includes a position holding portion that holds the position of the second locking member in the locking release position by engaging the second locking member when the first opening and closing body and the second opening and closing body are in the closed state.

5. The image reading apparatus according to claim 4, wherein the second biasing unit serves as a third biasing unit.

6. The image reading apparatus according to claim 2, wherein an engagement face that engages the first locking member in the second locking member includes a first engagement surface formed in a circular arc surface that holds the first locking member in the locking release position by engaging the first locking member when the second locking member rotates, and a second engagement surface formed in an inclined surface in which the first locking member is displaced between the locking release position and the locking position by engaging the first locking member when the second locking member slides between the first position and the second position.

7. The image reading apparatus according to claim 1, wherein the second locking member is in a state of ordinarily protruding towards the second opening and closing body from an opening portion formed in the first opening and closing body.

* * * * *